United States Patent
Lee et al.

(10) Patent No.: US 8,123,285 B2
(45) Date of Patent: Feb. 28, 2012

(54) UPPER PILLAR STRUCTURE OF VEHICLE

(75) Inventors: Byung Ok Lee, Yongin-si (KR); Dong Oh Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 184 days.

(21) Appl. No.: 12/510,029

(22) Filed: Jul. 27, 2009

(65) Prior Publication Data

US 2010/0084890 A1    Apr. 8, 2010

(30) Foreign Application Priority Data

Oct. 2, 2008    (KR) ........................ 10-2008-0097133

(51) Int. Cl.
*B62D 25/00*    (2006.01)

(52) U.S. Cl. ......... 296/193.06; 296/187.02; 296/203.03; 296/208

(58) Field of Classification Search ............. 296/187.02, 296/193.03, 203.03, 193.06, 80, 208, 190.09; B62D 25/00
See application file for complete search history.

(56) References Cited

U.S. PATENT DOCUMENTS

| | | | | |
|---|---|---|---|---|
| 4,810,548 A | * | 3/1989 | Ligon et al. | 428/71 |
| 5,195,779 A | * | 3/1993 | Aoyama et al. | 280/784 |
| 5,642,914 A | * | 7/1997 | Takabatake | 296/187.02 |
| 6,003,274 A | * | 12/1999 | Wycech | 52/232 |
| 6,186,581 B1 | * | 2/2001 | Onoue | 296/187.01 |
| 6,920,693 B2 | * | 7/2005 | Hankins et al. | 29/897.2 |
| 7,140,668 B2 | * | 11/2006 | Wesch et al. | 296/187.02 |
| 7,654,571 B2 | * | 2/2010 | Gabbianelli et al. | 280/781 |
| 2005/0082872 A1 | * | 4/2005 | Rich et al. | 296/187.02 |

FOREIGN PATENT DOCUMENTS

| | | |
|---|---|---|
| JP | 61-190773 U | 11/1986 |
| JP | 10-45025 A | 2/1998 |
| JP | 11-198855 A | 7/1999 |
| JP | 2001-294173 A | 10/2001 |
| JP | 2002-331960 A | 11/2002 |

* cited by examiner

*Primary Examiner* — Glenn Dayoan
*Assistant Examiner* — Pinel Romain
(74) *Attorney, Agent, or Firm* — Morgan, Lewis & Bockius LLP

(57) ABSTRACT

An upper pillar structure of a vehicle may include a pad assembly for sealing an air intake portion formed between a side inner panel and a side outer panel, the pas assembly including a fixing member disposed at lower side of the air intake portion, and a rotating member, a portion of which is rotatably coupled to the fixing member and moves to top portion of the air intake portion by actuation of the side outer panel.

12 Claims, 12 Drawing Sheets

FIG. 1 *(Prior Art)*

UPPER PILLAR STRUCTURE OF VEHICLE

CROSS-REFERENCE TO RELATED APPLICATION

The present application claims priority to Korean Patent Application No. 10-2008-0097133 filed Oct. 2, 2008, the entire contents of which application is incorporated herein for all purpose by this reference.

BACKGROUND OF THE INVENTION

1. Field of the Invention

The present invention relates to an upper pillar structure of a vehicle, and more particularly, to an upper pillar structure, which improves a pad assembly provided in an air intake portion formed at an upper end of the pillar portion of a vehicle and thus enhances an assembling property and a sealing property.

2. Description of Related Art

In general, a car body of a vehicle takes a box shape constituted from a proper combination of various panels and frames, and the car body produced from such a combination in which the frames and a body are integrally formed is referred to as a monocoque structure.

An assembling sequence of such a monocoque structure is determined according to a layout of production line of a vehicle manufacturing company. A front portion, a rear portion, and a dashboard portion are first assembled, and then a side pillar portion is assembled. Finally, a cowl portion is mounted.

Here, the pillar portion and the cowl portion restrain the vibration that occurs during the drive of a vehicle, in particular, the twist of a car body that occurs at a sharp turn, absorb impact energy at a collision of the vehicle, and prevent the impact energy from being transmitted to a compartment of the vehicle.

FIG. 1 is a perspective view showing an engagement structure of an upper end of the pillar upper portion and the cowl portion of the vehicle according to the prior art, FIG. 2 is a perspective view showing a structure of the upper end of the pillar portion of the vehicle, FIG. 3 is a perspective view showing a pad assembly according to the prior art, and FIG. 4 is a sectional view showing an assembled state of the upper pillar structure of the vehicle according to the prior art.

The engagement structure of an upper end of the pillar upper portion and the cowl portion of the vehicle according to the prior art, as shown in FIG. 1 and FIG. 2, includes a pillar portion 10 and a cowl portion 20, the pillar portion 10 comprising a side outer panel 11, a side inner panel 12 and a side outer reinforcement 13.

Further, the cowl portion 20 comprises a cowl inner panel, a cowl top reinforcement, a cowl side upper inner panel and a cowl side upper outer panel.

That is, such an engagement of the pillar portion 10 and the cowl portion 20 reinforces the strength and rigidity of the vehicle, and thus protects the vehicle occupants by absorbing the impact force that occurs at a collision.

On the other hand, the upper end of the pillar portion 10 includes an air intake portion 14 between the side outer panel 11 and the side inner panel 12. The air intake portion 14 is exposed to the exterior. Accordingly, there is a problem when water or exterior air flows through the air intake portion 14, it causes wind noise to be generated.

In order to solve this problem, the air intake portion 14 includes a pad assembly 15 that seals the air intake portion 14.

As shown in FIG. 3, the pad assembly 15 includes a fixing member 15a disposed under the air intake portion 14 that seals a lower part of the air intake portion 14, and a pad member 15b disposed on a peripheral surface of the fixing member 15a to seal the gap between the fixing member 15a and the air intake portion 14.

Further, as shown in FIG. 4, a foamable resin 16 that seals the top of the air intake portion 14 is injected into the gap between the fixing member 15a and the top of the air intake portion 14.

An assembling method of the upper pillar structure of the vehicle having such a constitution will be described with reference to the accompanying FIG. 4.

First, the pad assembly 15 is disposed between the side inner panel 12 and the side outer reinforcement. Then, if the side outer panel 11 approaches toward the side inner panel 12, a flange of the side outer panel 11 is supported and guided by the top surface of the pad assembly 15, and thus is engaged therewith.

Next, when the foamable resin 16 is injected into a gap between the top surface of the pad assembly 15 and the inside upper portion of the side outer panel 11 and seals it, the assembling process of the upper pillar structure of the vehicle is completed.

However, the upper pillar structure for the vehicle as mentioned above has the problem that since the top of the air intake portion 14 should be sealed by injecting the foamable resin 16, the assembling property is deteriorated and also additional costs are incurred.

Moreover, there is a problem that since the difference in height between the pad assembly 15 and the side outer panel is large, there is a dead zone into which the foamable resin 16 can not inject, and water or exterior air flows through the dead zone into a compartment of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an upper pillar structure of a vehicle which enhances its effectiveness in use, assembling property and sealing property, and reduce the cost by improving a pad assembly applied at an upper end of a pillar portion of a vehicle.

In an aspect of the present invention, an upper pillar structure of a vehicle, may include a pad assembly for sealing an air intake portion formed between a side inner panel and a side outer panel, the pas assembly having a fixing member disposed at lower side of the air intake portion, and a rotating member, a portion of which is rotatably coupled to the fixing member and moves to top portion of the air intake portion by actuation of the side outer panel.

A pad member having elasticity may be provided on a peripheral surface of the fixing member and the rotating member.

A foamable resin may be injected into a gap between the rotating member and the top portion of the air intake portion after the rotating member is engaged to the top portion of the air intake portion.

The rotating member and the fixing member may be pivotally coupled by a rotating shaft, the rotating member including a sealing portion which is rotatably engaged with the rotating shaft, and an fixing part which is integrally formed with the sealing portion and is configured to be activated by the side outer panel to rotate the sealing portion to be inserted into the top portion of the air intake portion.

The rotating shaft may be disposed substantially in middle position on upper portion of the fixing member.

The rotating member may have a fixing projection formed on a lateral surface thereof and slidably coupled to the fixing member to regulate a rotating angle of the rotating member.

The fixing member may have fixing recesses on the upper portion thereof on both sides with respect to the rotating shaft respectively so that the fixing projection is selectively inserted into one of the fixing recesses when the rotating member rotates by the side outer panel.

An elastic member may be provided on the rotating shaft and elastically supports the rotating member against the side outer panel.

The rotating member and the fixing member may be pivotally coupled by a rotating shaft, the rotating member including a sealing portion which is rotatably engaged with the rotating shaft and is configured to be inserted into the top portion of the air intake portion by actuation of the side outer panel, and an elastic member which is provided on the rotating shaft and elastically supports the sealing portion against the side outer panel.

The rotating shaft may be disposed substantially in one of distal ends of upper portion of the fixing member.

The rotating member and the fixing member may be coupled by a fixing portion integrally coupled to one of distal ends of upper portion of the fixing member, the rotating member including a sealing portion which integrally extends to the top portion of the air intake portion from the fixing portion and has an elastic resilience biasing against the side outer panel, A guiding portion may be provided at one end of the rotating member for guiding a leading edge of the side outer panel.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
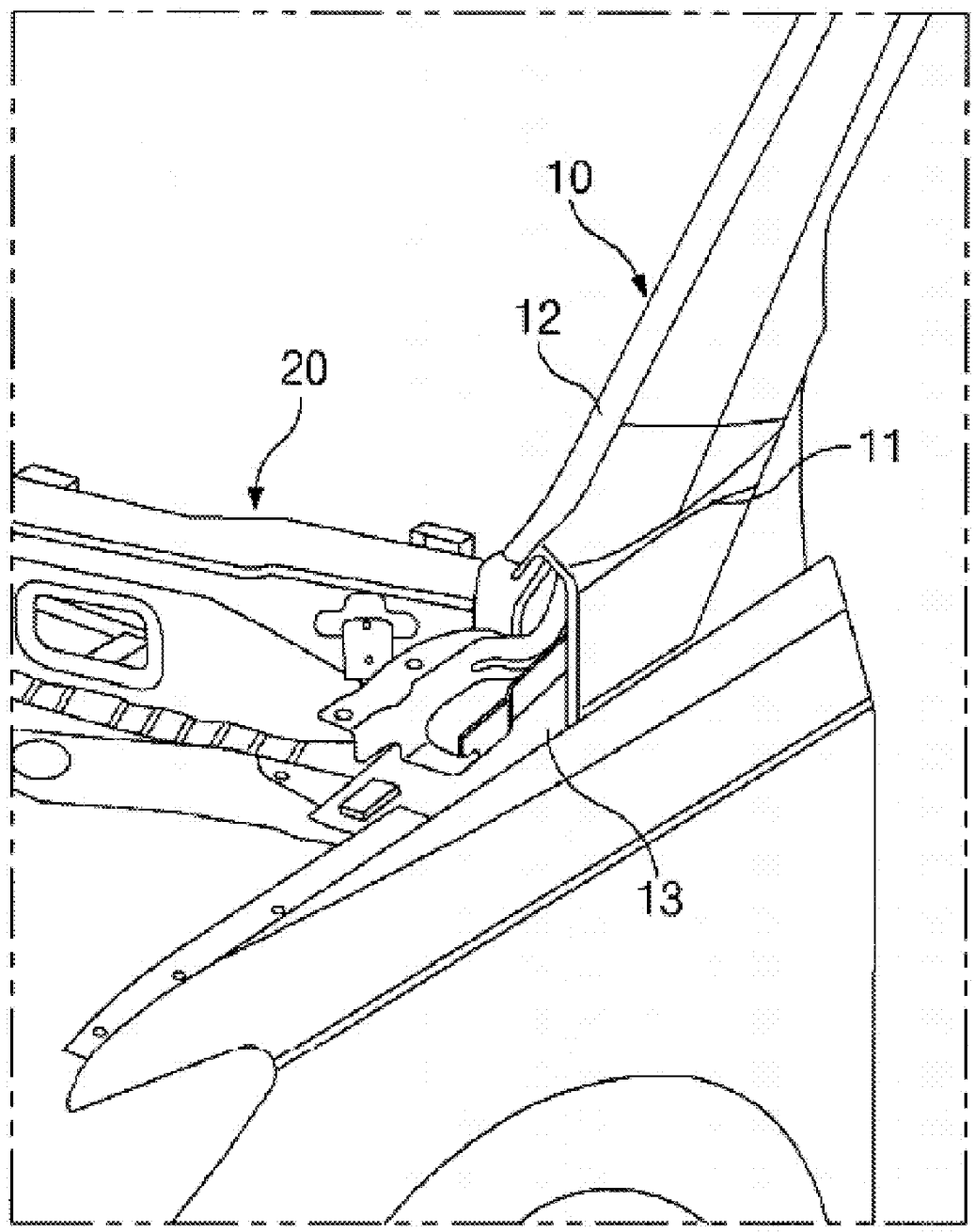
FIG. 1 is a perspective view showing an engagement structure of an upper end of the pillar upper portion and the cowl portion of the vehicle according to the prior art.
Figure 2:
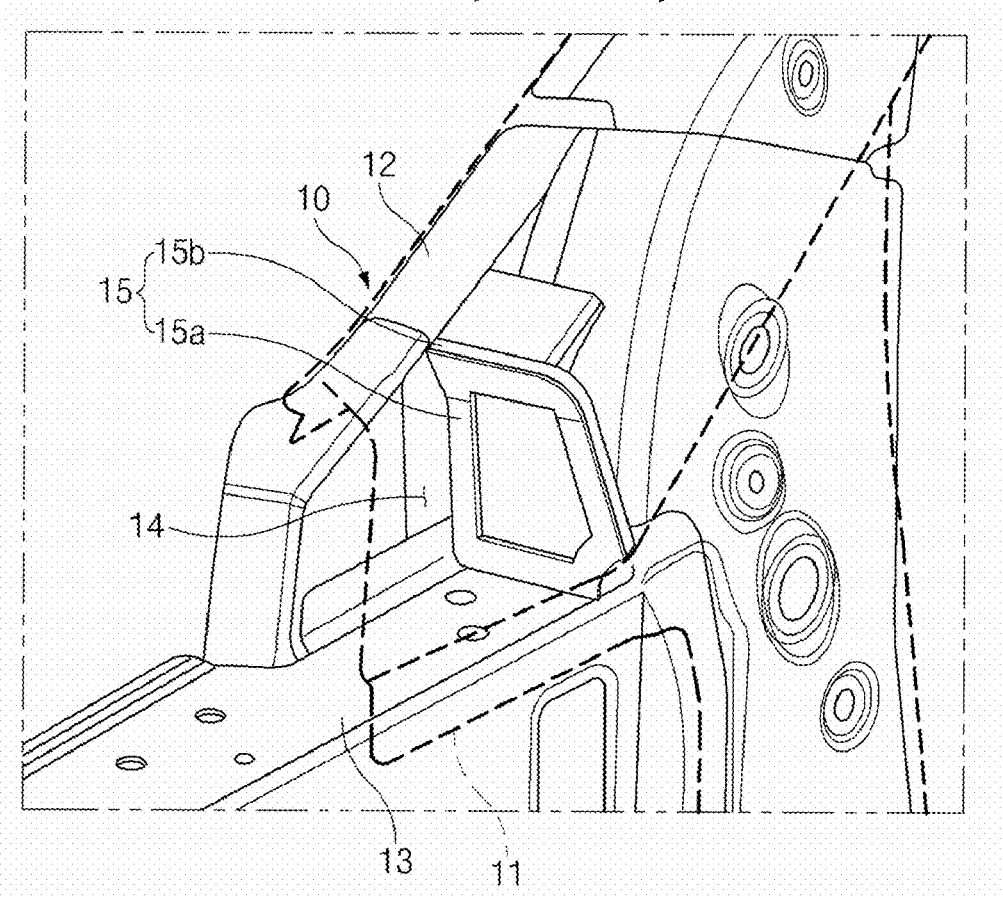
FIG. 2 is a perspective view showing an upper pillar structure of the vehicle according to the prior art.
Figure 3:
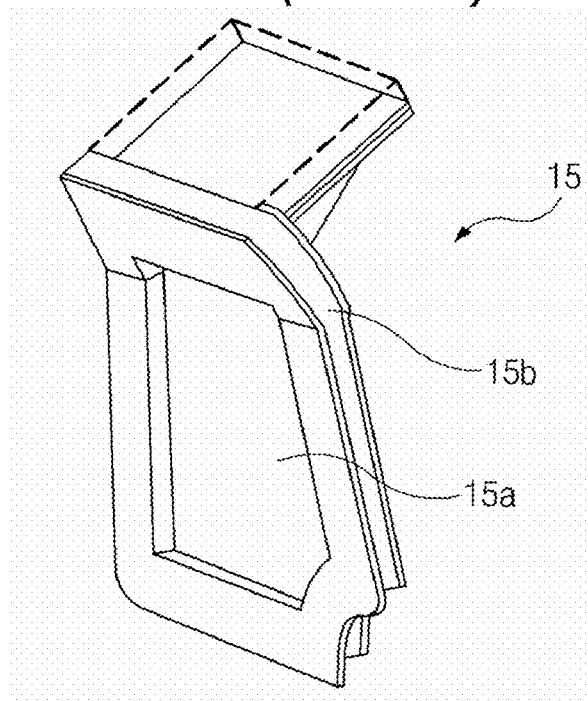
FIG. 3 is a perspective view showing a pad assembly according to the prior art.
Figure 4:
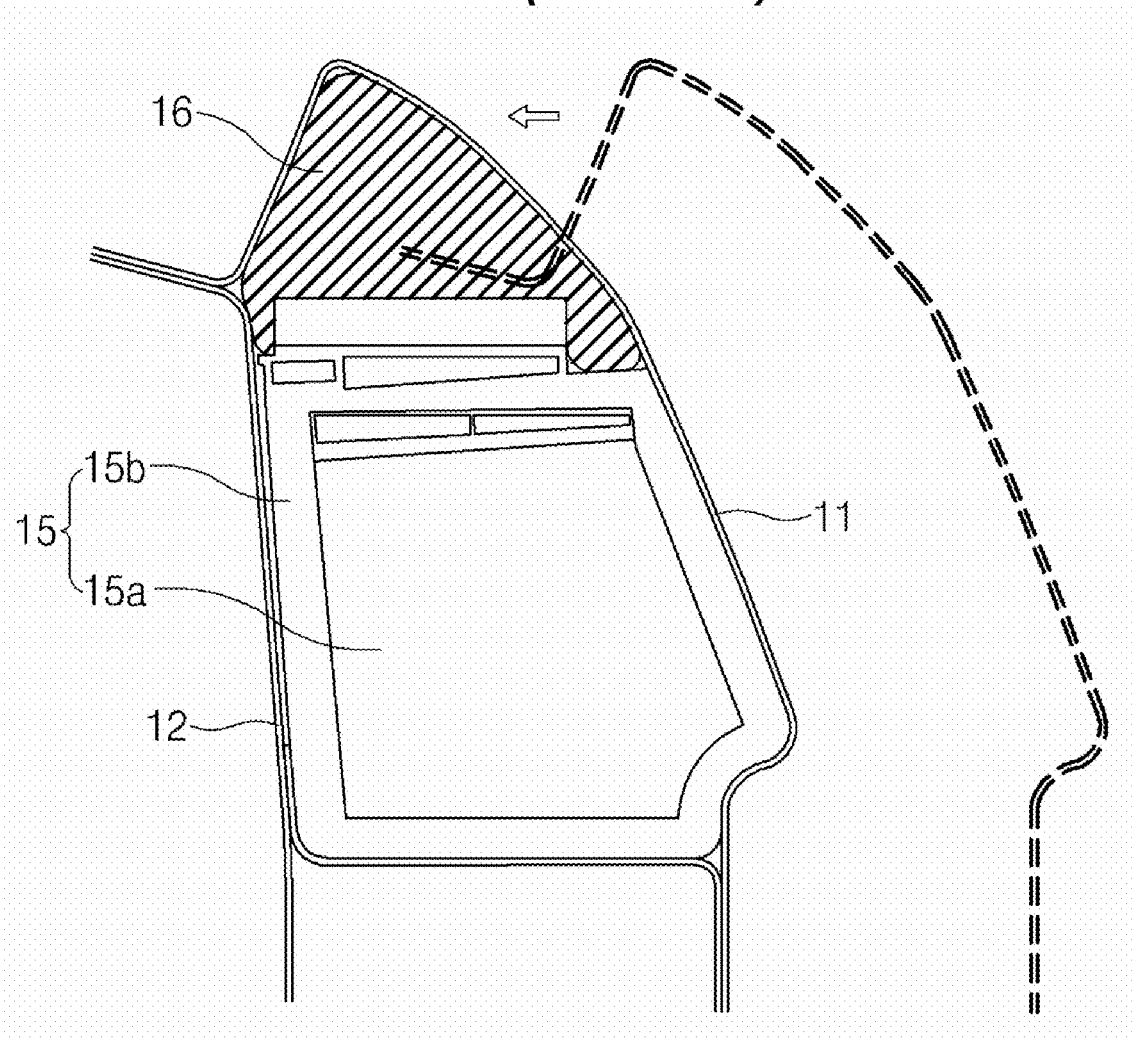
FIG. 4 is a sectional view showing an assembled state of the upper pillar structure of the vehicle according to the prior art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Various exemplary embodiments of the present invention will now be described in detail with reference to FIGS. 5 to 13c.

The upper pillar structure of the present invention includes a side inner panel 100, a side outer panel 200 which is engaged with the side inner panel 100 and forms an appearance of the vehicle, and a pad assembly 300, 300' and 300" which seals an air intake portion 400 formed between the side inner panel 100 and the side outer panel 200.

Here, the side inner panel 100 and the side outer panel 200 have the same constitution and function as that of the side inner panel and the side outer panel described in the prior art, and thus a detailed description of their constitution will be omitted.

The pad assembly 300, 300' and 300" seals the air intake portion 400 so that entrance of water and air is blocked, whereby an assembly process is efficient and the cost is reduced.

Now, various embodiments of the pad assembly 300, 300' and 300" will be described with reference to the accompanying drawings.

As shown in FIGS. 5 to 8e, a pad assembly 300 of the present exemplary embodiment includes a fixing member 310 disposed under an air intake portion 400, and a rotating member 320 which is disposed on one side of the fixing member 310 and rotates to a non-interference position when a side outer panel 200 approaches and is inserted into the top of the air intake portion 400 upon completion of approach. Optionally, a pad member 330 is attached to a peripheral surface of the fixing member 310 and the rotating member 320.

The fixing member 310 seals the bottom of the air intake portion 400. The fixing member is disposed under the air intake portion 400 in a close surface contact therewith and is fixed to a side inner panel 200 by bolt connection, whereby water or air which will otherwise be flow through a bottom of the air intake portion 400 is blocked.

Further, a rotating shaft 311 is formed on one upper side of the fixing member 310, a rotating member 320 being rotatably engaged with the rotating shaft.

Figure 5:
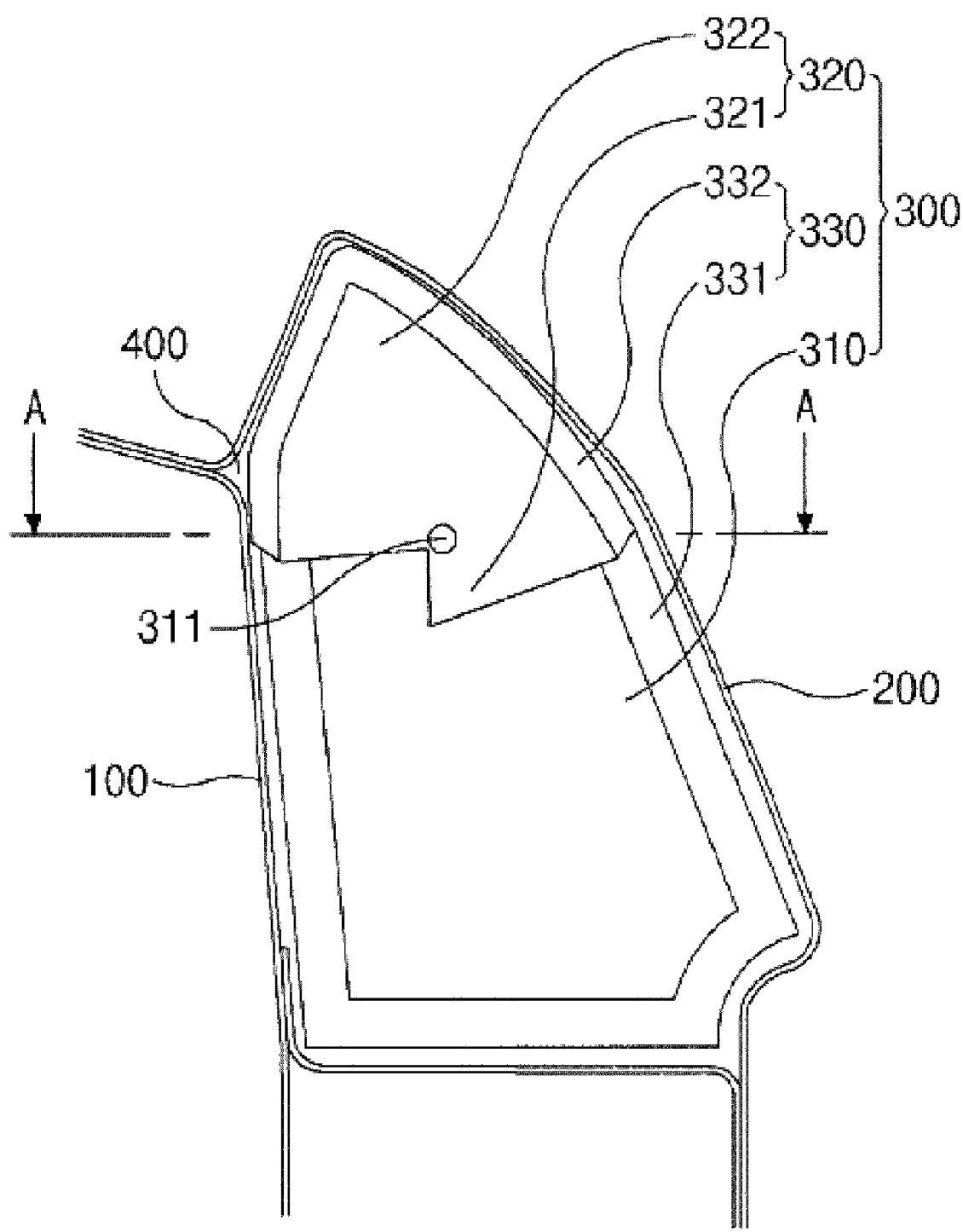
FIG. 5 is a sectional view showing an exemplary upper pillar structure of the vehicle according to the present invention.

The rotating member 320 seals the top of the air intake portion 400. The rotating member includes a sealing portion 322 which is rotatable engaged with the rotating shaft 311 and is inserted into the top of the air intake portion 400 to seal the top of the air intake portion 400, and an fixing part 321 which rotates the sealing portion 322 in a counterclockwise direction as seen in FIG. 5 when the side outer panel 200 approaches and is inserted into the top of the air intake portion 400 upon completion of the approach.

Here, the rotating member 320 maintains a state that, when no external force is applied, the fixing part 321 is always located at the top by load of the sealing portion 322. That is, the rotating member 320 has an inverted triangular shape (refer to FIG. 7 and FIG. 8a).

That is, as for the rotating member 320, as shown in FIGS. 8a to 8e, when the side outer panel 200 approaches toward the side inner panel 100 (see FIG. 8a), the flange 210 of the side outer panel 200 is supported by the fixing part 321 and simultaneously pushes the fixing member 310 so that the sealing portion 322 rotates about the rotating shaft 311 of the fixing member 310 (see FIG. 8b).

Then, when the side outer panel 200 approaches approximately 70%, the fixing part 321 moves downwards and simultaneously the sealing portion 322 moves upwards (see FIG. 8c) wherein as an inner top surface of the side outer panel 200 pushes the sealing portion 322, the sealing portion 322 again rotates (see FIG. 8d).

Subsequently, when approach of the side outer panel 200 is completed, the sealing portion 322 is inserted into and supported by the top of the air intake portion 400 (see FIG. 8e).

Here, the rotating member 320 further includes an fixing projection 323 for regulating a rotating angle of the sealing portion 322, the fixing projection being formed on one side of the sealing portion 322 to protrude toward the fixing member 310 and supported on one side top surface of the fixing member 310.

The fixing member 310 has fixing recesses 312 on its top surface on both sides, respectively so that the fixing projection 323 is inserted into and supported by the recess.

That is, the fixing projection 323 is inserted into and supported by the fixing recess 312 formed on a left side of the rotating shaft 311 when the fixing part 321 is located at the top in a vertical state whereas the fixing projection 323 is inserted into and supported by the fixing recess 312 formed on a right side of the rotating shaft 311 when the sealing portion 322 is located at the top.

Figure 6:
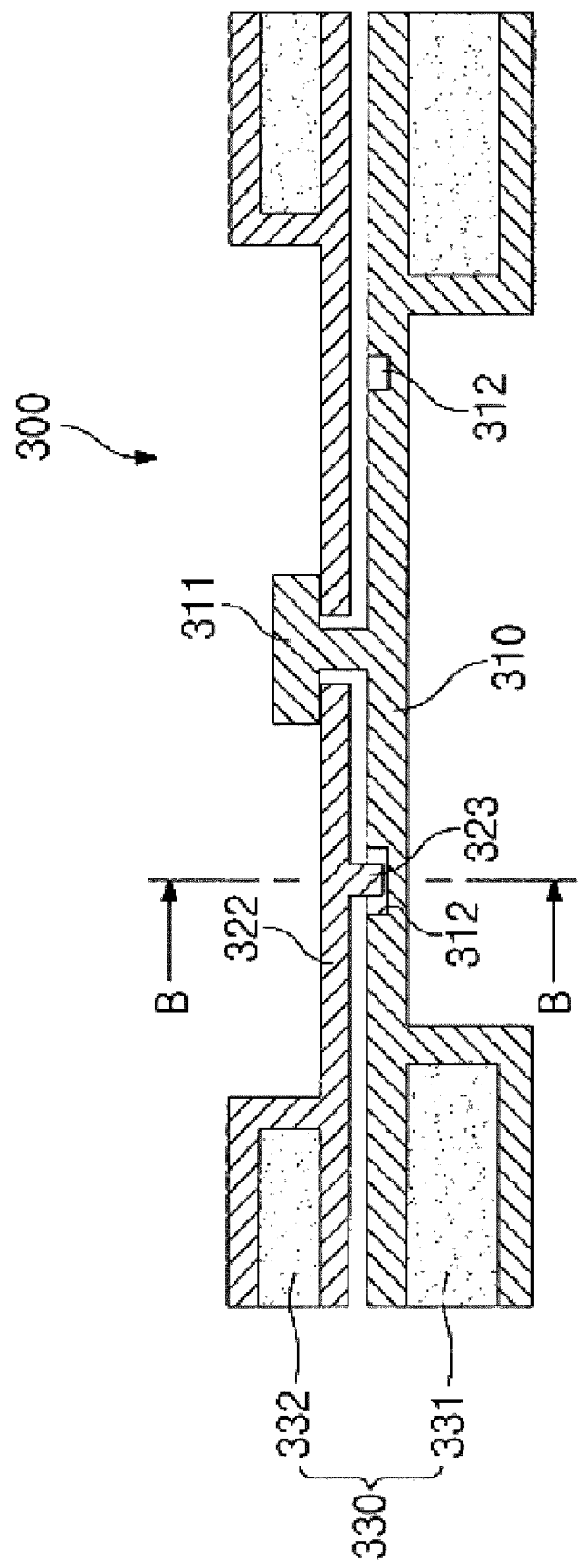
FIG. 6 is a sectional view taken along line A-A of FIG. 5.
Figure 7:
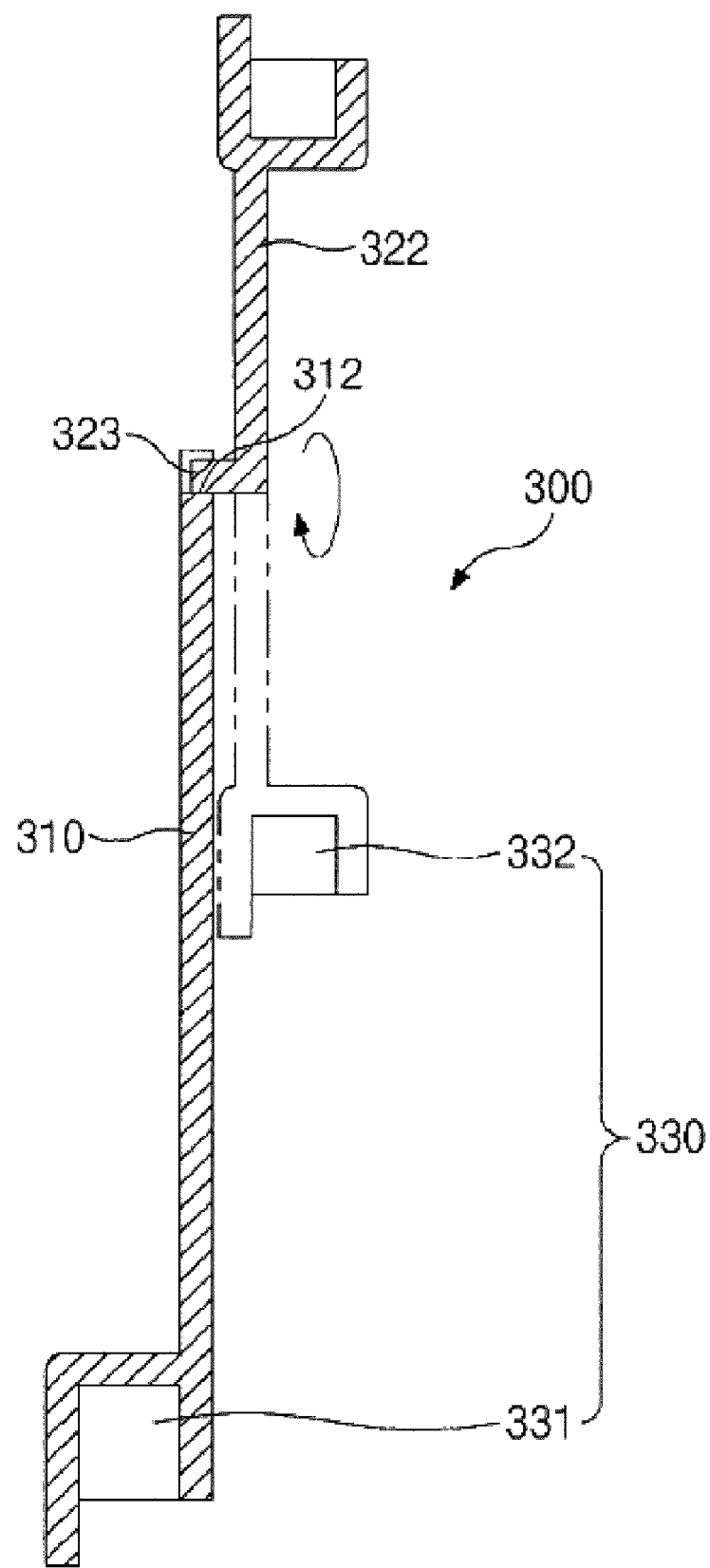
FIG. 7 is a sectional view taken along line B-B of FIG. 6.
Figure 8:
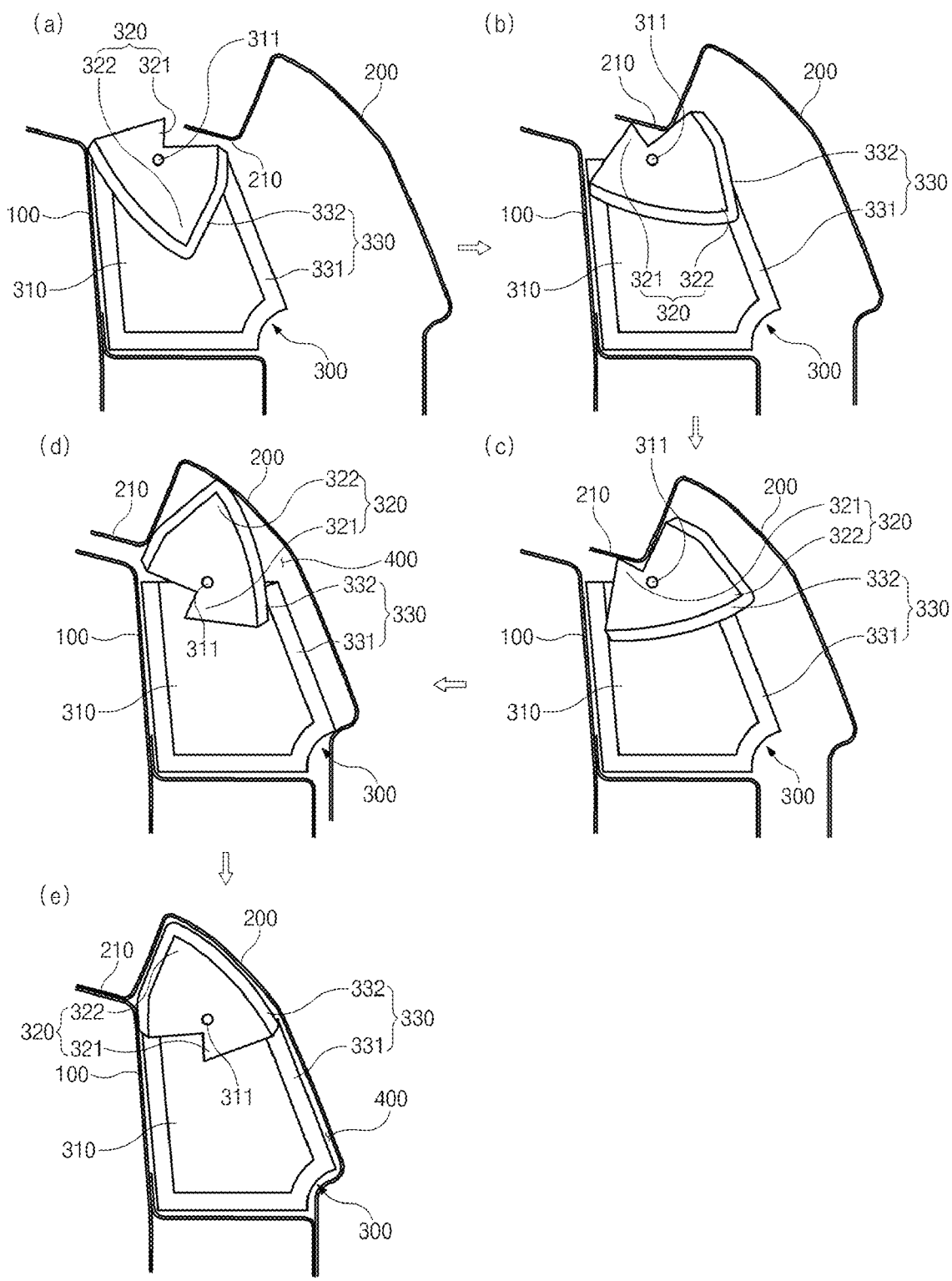
FIGS. 8a to 8e illustrate an assembled state of the upper pillar structure of the vehicle shown in FIG. 5.

Accordingly, before the rotating member 320 rotates, the fixing projection 323 is inserted into the fixing recess 312 formed on a right side of the fixing member 310 as seen from FIG. 6, whereby rotation in a direction opposite to the approaching direction of the side outer panel 200 is prevented, and thus a stable support between the flange 210 of the side outer panel 200 and the sealing portion 322 can be derived.

On the other hand, after the rotating member 320 has been rotated, the fixing projection 323 is inserted into the fixing recess 312 formed on a left side of the fixing member 310 as seen from FIG. 6, whereby rotation in a direction toward the side inner panel 100 is prevented, and thus the sealing portion 322 can be stably supported on an inner top of the side outer panel 200.

In other embodiments of the present invention, an elastic member may be mounted on the rotating shaft 311 so that the elastic member may support the rotating member 320 in the counterclockwise direction.

The pad member 330 is to seal a gap between the air intake portion 400 and the pad assembly 300, is made from a synthetic resin having elasticity, and is attached along the peripheral surface of the pad assembly 300.

That is, the pad assembly 330 includes a first pad 331 attached to the peripheral surface except the top surface of the fixing member 310, and a second pad 332 attached to the peripheral surface of the sealing portion 322 of the rotating member 320.

Accordingly, it is possible to effectively seal a gap which may be occur between the pad assembly 300 and the air intake portion 400, through the pad member 330.

On the other hand, optionally, a foamable resin (not illustrated) can be injected between the pad assembly 300 and the air intake portion 400. The foamable resin can prevent any playing motion of the pad assembly 300 and seal the gap occurred between the pad assembly 300 and the air intake portion 400 to enhance the sealing property.

Here, one or both of the pad member 330 and the foamable resin can be applied between the pad assembly 300 and the air intake portion depending on a kind and a size of the applied vehicle.

Therefore, the pad assembly 300 according to various embodiments constitutes a rotating member 320 which rotates about the rotating shaft 311 over 180 degrees when the side outer panel 200 approaches, and is inserted into top of the air intake portion 400, and thus effectively seals the top and bottom of the air intake portion 400.

Now, in describing other exemplary embodiments of the pad assembly according to the present invention, the constituents having the same constitution and function as those described in the above-described exemplary embodiments will be denoted by the same symbols as above, and description of these constituents will be omitted.

Figure 9:
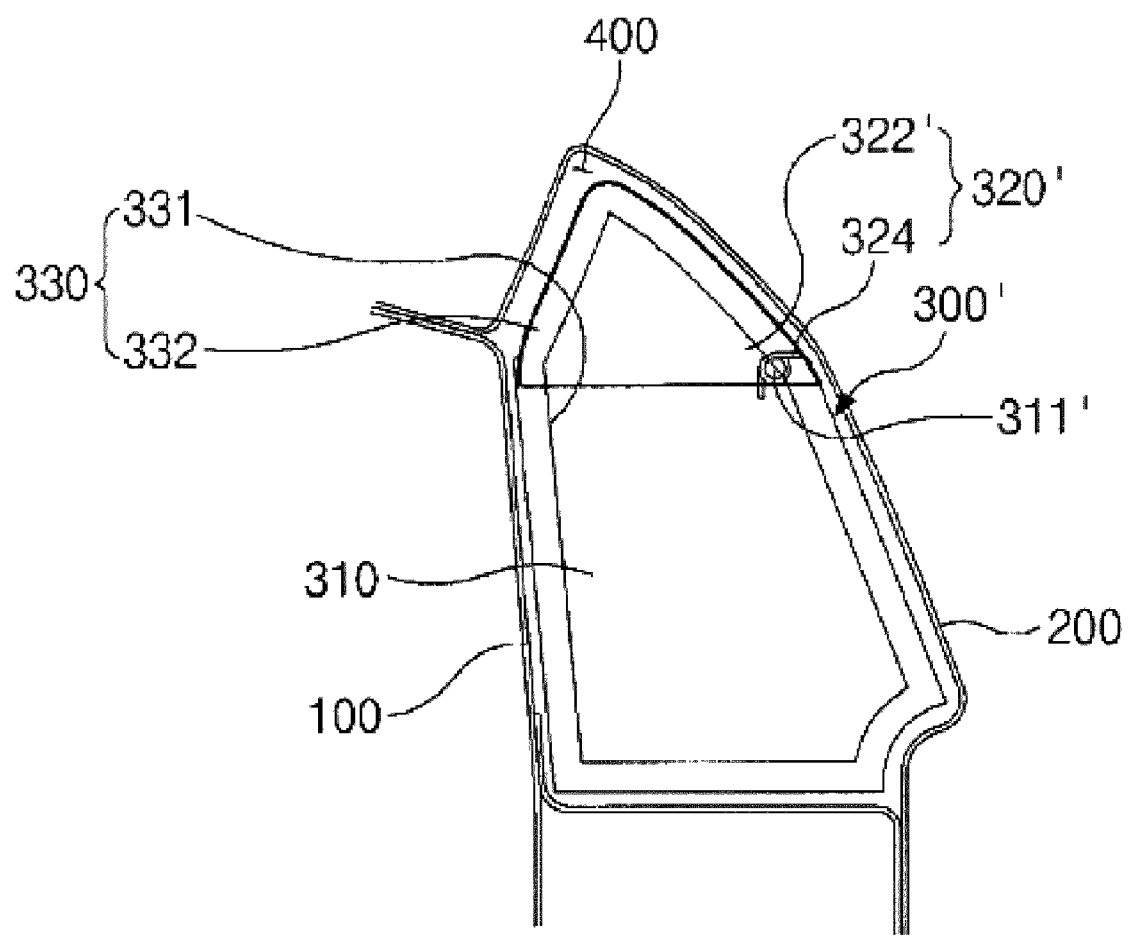
FIG. 9 is a sectional view showing another exemplary upper pillar structure of the vehicle according to the present invention.
Figure 10:
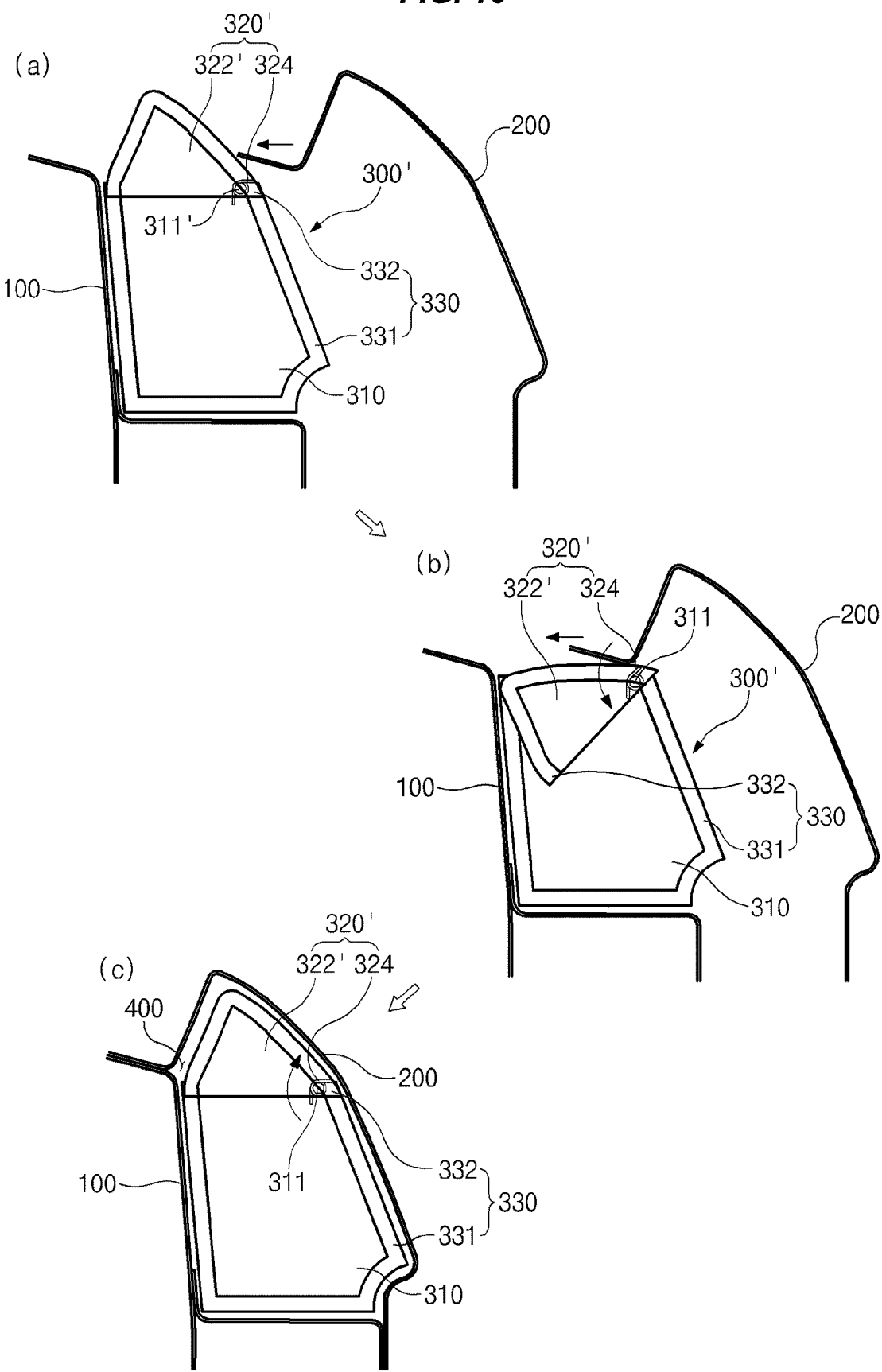
FIGS. 10a to 10c illustrate an assembled state of the upper pillar structure of the vehicle shown in FIG. 9.

As shown in FIG. 9, a pad assembly 300' according to various embodiments includes a fixing member 310 disposed under an air intake portion 400, and a rotating member 320' which is disposed on one side of the fixing member 310 and rotates to a non-interference position when a side outer panel 200 approaches and is inserted into the top of the air intake portion 400 upon completion of approach. Optionally, a pad member 330 is attached to a peripheral surface of the fixing member 310 and the rotating member 320'.

Here, the side inner panel 100, the side outer panel 200, the fixing member 310 and the pad member 330 have the same constitution and function as those of the side inner panel 100, the side outer panel 200, the fixing member 310 and the pad member 330 as described in the above-described exemplary embodiments, and thus their detailed description will be omitted.

The rotating member 320' is to seal the top of the air intake portion 400. The rotating member 320' includes a sealing portion 322' which is rotatably engaged with the rotating shaft 311' formed at one of the distal upper ends of the fixing member, and an elastic part 324 which is provided on the rotating shaft 311' and elastically supports the sealing portion 322'.

That is, the rotating member 320' elastically supports the sealing portion 322' upwards by the elastic part 324, and thus is inserted into the top of the air intake portion 400 when approach of the side outer panel 200 is completed.

Accordingly, as for the rotating member 320', as shown in FIGS. 10a to 10c, when the side outer panel 200 approaches toward the side inner panel 100 (see FIG. 10a), the flange 210 of the side outer panel 200 pushes the sealing portion 322', so that the sealing portion 322' rotates downwards about the rotating shaft 311', whereby the elastic part 324 stores its elastic resilience while being compressed (see FIG. 10b).

Then, when approach of the side outer panel 200 is completed, the sealing portion 322' of the rotating member 320' returns its original position due to the elastic resilience of the elastic part 324 and is inserted into the top of the air intake portion 400 and seals it (see FIG. 10c).

Therefore, the pad assembly 300' of various embodiments closes the bottom of the air intake portion 400 through the fixing member 310, and closes the top of the air intake portion 400 through the rotating member 320' which rotates downwards so as not to be interfered when the side outer panel 200 approaches and is inserted into the top of the air intake portion 400 while being restored by the elastic part 324 upon completion of approach.

The pad assembly 300' according to various embodiments can effectively seal the top and bottom of the air intake portion 400 through the rotating member 320' which is elastically supported upwards and downwards about the rotating shaft 311' of the fixing member 310.

On the other hand, optionally, a foamable resin 500 can be injected between the pad assembly 300 and the air intake portion 400. The foamable resin can prevent any playing motion of the pad assembly 300 and seal the gap occurred between the pad assembly 300 and the air intake portion 400 to enhance the sealing property.

Figure 11:
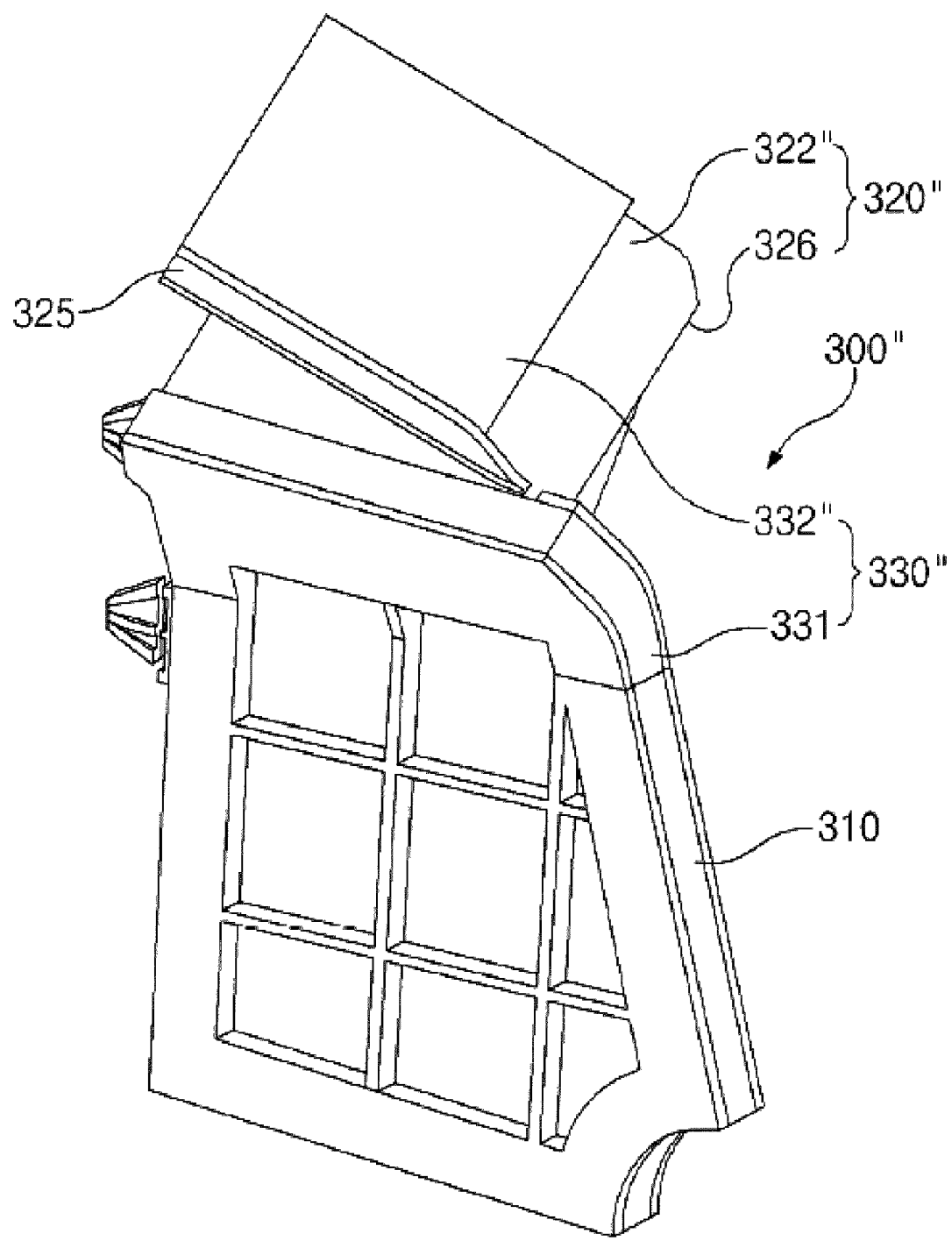
FIG. 11 is a front perspective view showing another exemplary upper pillar structure of the vehicle according to the present invention.
Figure 12:
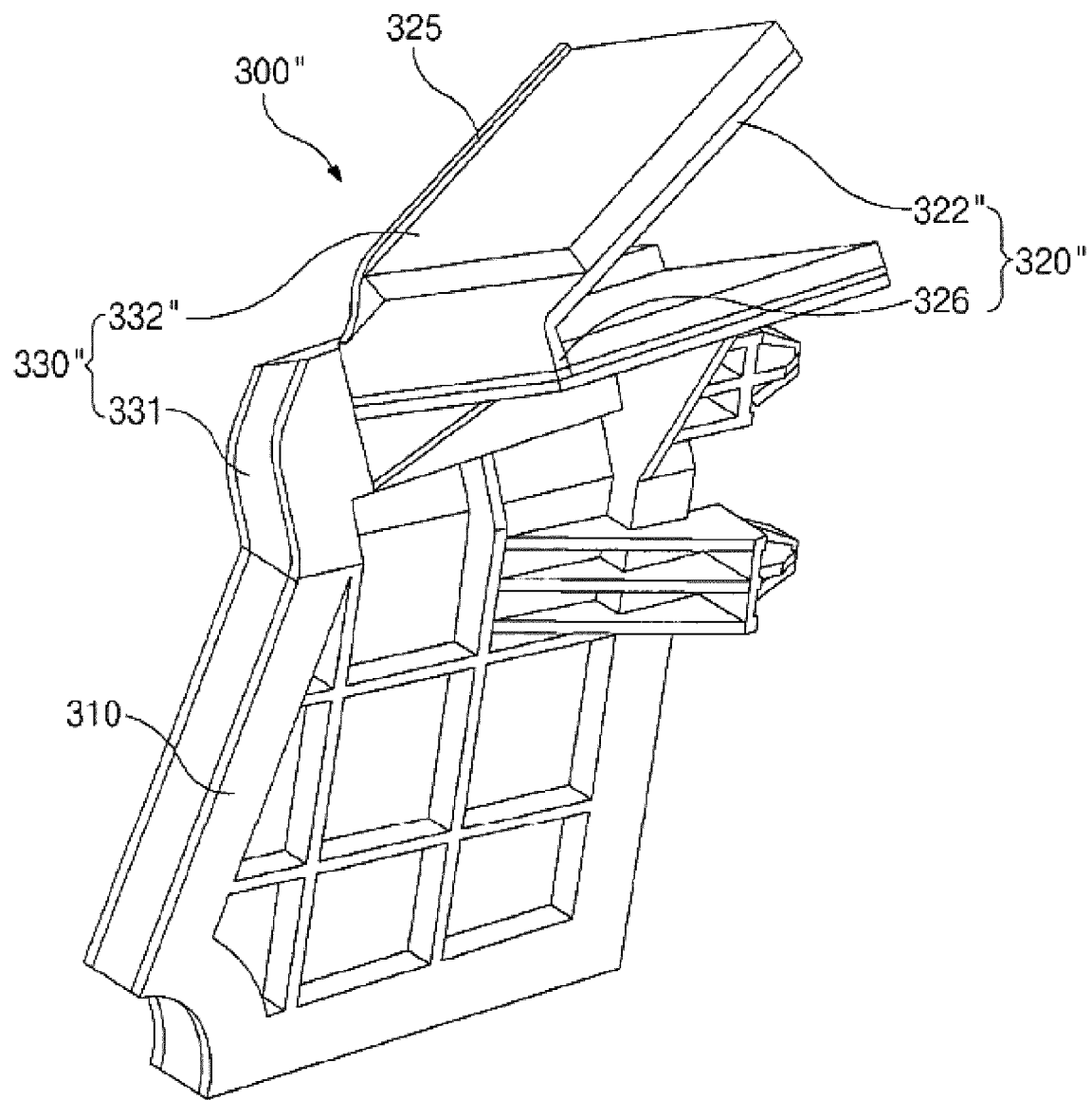
FIG. 12 is a rear perspective view showing another exemplary upper pillar structure of the vehicle according to the present invention.
Figure 13:
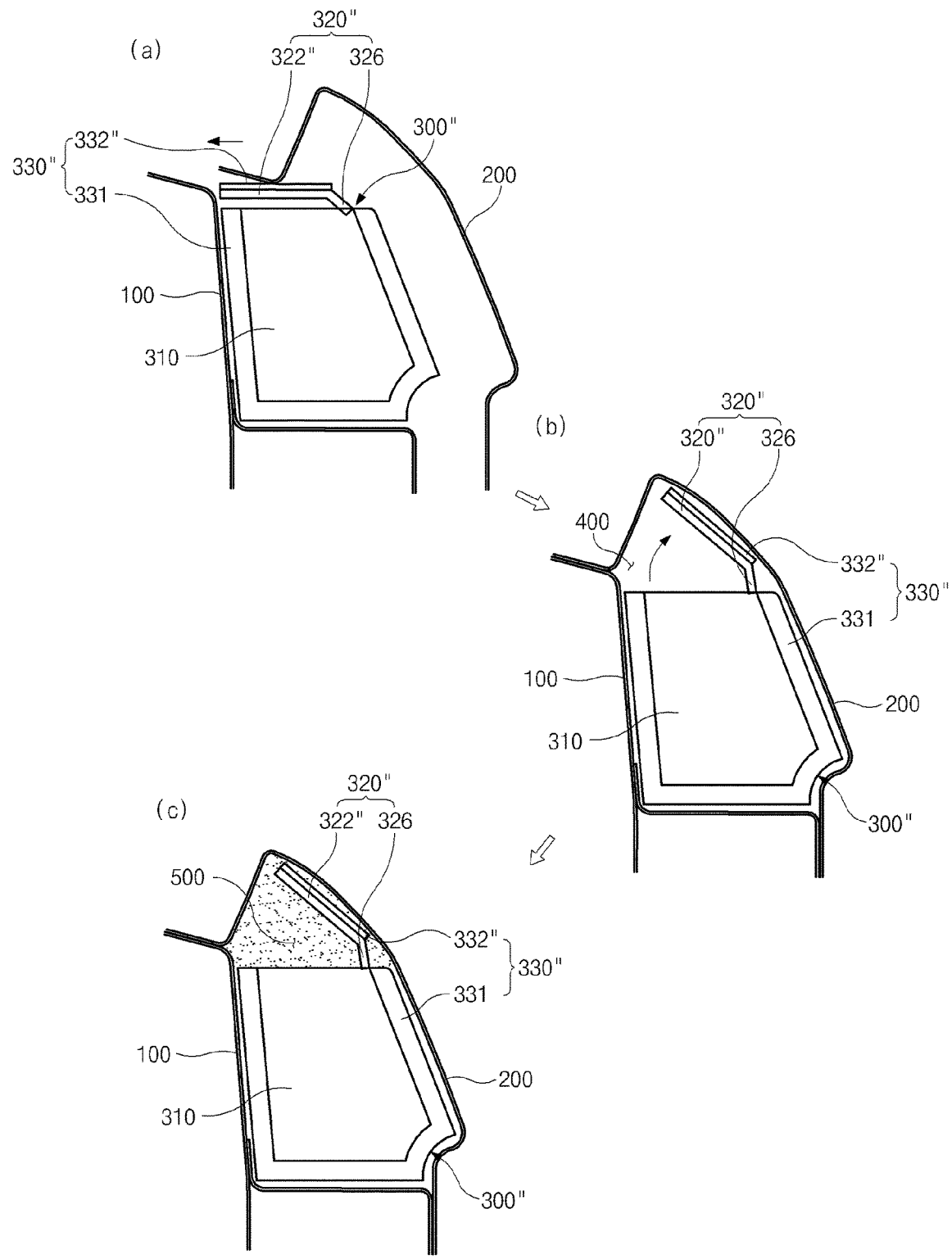
FIGS. 13a to 13c illustrate an assembled state of the upper pillar structure of the vehicle shown in FIGS. 10a to 10c.

As shown in FIG. 11, a pad assembly 300" according to various embodiments includes a fixing member 310 disposed under an air intake portion 400 in a close surface contact therewith, and a rotating member 320" which is disposed on one side of the fixing member 310 and rotates to a non-interference position when a side outer panel 200 approaches and is inserted into the top of the air intake portion 400 upon completion of approach. Optionally, a pad member 330" is attached to a peripheral surface of the fixing member 310 and the rotating member 320".

Here, the side inner panel 100, the side outer panel 200 and the fixing member 310 have the same constitution and function as those of the side inner panel 100, the side outer panel 200 and the fixing member 310 as described in the above-described exemplary embodiments, and thus their detailed description will be omitted.

The rotating member 320" includes a fixing portion 326 which is engaged with one end of the fixing member 310, and a sealing portion 322" which extends to the top of the air intake portion 400 and has an elastic resilience, the fixing portion 326 being formed integrally with the sealing portion 322".

That is, the sealing portion 322" of the rotating member 320" bends downwards about the fixing portion 326 by the flange 210 of the side outer panel 200, and is inserted to the upper side of the air intake portion 400 while being returned to its original position by the elastic resilience of the sealing portion 322" when approach of the side outer panel 200 is completed.

On the other hand, the pad member 330" constituted by the first and second pad 331 and 332" is provided on a surface of the rotating member 320" and a peripheral surface of the fixing member 310, respectively, and seals a gap which may be formed between the pad assembly 300" and the air intake portion 400 through the pad member 330" to enhance the sealing property.

Here, optionally, a foamable resin 500 can be injected between the rotating member 320" and the air intake portion 400. The foamable resin 500 can enhance the sealing property between the rotating member 320" and the top of the air intake portion 400.

On the other hand, a guiding portion 325 is provided on a side of the rotating member 320" for guiding the side outer panel 200 when the side outer panel 200 approaches. The guiding portion 325 can accurately engage the side outer panel 200 with the side inner panel 100.

Accordingly, as shown in FIGS. 13a to 13c, when the side outer panel 200 approaches toward the side inner panel 100, the rotating member 320" moves while the flange 210 of the side outer panel 200 is supported by the guiding portion 325, and the sealing portion 322" is bended and rotated downwards so as not to be interfere with when the side outer panel 200 approaches (see FIG. 13a).

When the approach of the side outer panel 200 is completed, the rotating member is inserted into the top of the air intake portion 400 while being returned to its original position by an elastic resilience of the sealing portion 322" (see FIG. 13b).

Then, when a foamable resin 500 is injected into a gap between the top of the air intake portion 400 and the sealing portion 322" to seal a dead zone in which the gap may be occurred between the top of the air intake portion 400 and the sealing portion 322", the assembly is completed (see FIG. 13c).

Therefore, the pad assembly 300" of various embodiments closes the bottom of the air intake portion 400 through the fixing member 310, and closes the top of the air intake portion 400 through the foamable resin 500 and the rotating member 320" which is bent and rotates downwards so as not to be interfere with when the side outer panel 200 approaches and is inserted into the top of the air intake portion 400 while being restored upon completion of approach.

Accordingly, since the pad assembly including the fixing member and the rotating member is provided in the air intake portion formed between the side inner panel and the side outer panel, it is unnecessary to inject a separate foamable resin. Thus, this enhances a useful efficiency, an assembling property and a sealing property, whereby entrance of wind sound and water is prevented to improve a quality. Further, it is possible to reduce the cost considerably and shorten the labor time.

For convenience in explanation and accurate definition in the appended claims, the terms "upper", "lower", "front", "exterior", "outer", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An upper pillar structure of a vehicle, comprising a pad assembly for sealing an air intake portion formed between a side inner panel and a side outer panel, the pad assembly including:
   a fixing member disposed at lower side of the air intake portion; and
   a rotating member, a portion of which is rotatably coupled to the fixing member and moves to top portion of the air intake portion by actuation of the side outer panel;
   wherein the rotating member and the fixing member are pivotally coupled by a rotating shaft, the rotating member including:
      a sealing portion which is rotatably engaged with the rotating shaft; and a fixing part which is integrally formed with the sealing portion and is configured to be activated by the side outer panel to rotate the sealing portion to be inserted into the top portion of the air intake portion.

2. The upper pillar structure as claimed in claim 1, wherein a pad member having elasticity is provided on a peripheral surface of the fixing member and the rotating member.

3. The upper pillar structure as claimed in claim 1, wherein a foamable resin is injected into a gap between the rotating member and the top portion of the air intake portion after the rotating member is engaged to the top portion of the air intake portion.

4. The upper pillar structure as claimed in claim 1, wherein the rotating shaft is disposed substantially in middle position on upper portion of the fixing member.

5. The upper pillar structure as claimed in claim 4, wherein the rotating member has a fixing projection formed on a lateral surface thereof and slidably coupled to the fixing member to regulate a rotating angle of the rotating member.

6. The upper pillar structure as claimed in claim 5, wherein the fixing member has fixing recesses on the upper portion thereof on both sides with respect to the rotating shaft respectively so that the fixing projection is selectively inserted into one of the fixing recesses when the rotating member rotates by the side outer panel.

7. The upper pillar structure as claimed in claim 5, wherein an elastic member is provided on the rotating shaft and elastically supports the rotating member against the side outer panel.

8. The upper pillar structure as claimed in claim 1, wherein the rotating member and the fixing member are pivotally coupled by a rotating shaft, the rotating member including:
a sealing portion which is rotatably engaged with the rotating shaft and is configured to be inserted into the top portion of the air intake portion by actuation of the side outer panel; and
an elastic member which is provided on the rotating shaft and elastically supports the sealing portion against the side outer panel.

9. The upper pillar structure as claimed in claim 8, wherein the rotating shaft is disposed substantially in one of distal ends of upper portion of the fixing member.

10. The upper pillar structure as claimed in claim 1, wherein the rotating member and the fixing member are coupled by a fixing portion integrally coupled to one of distal ends of upper portion of the fixing member, the rotating member including:
a sealing portion which integrally extends to the top portion of the air intake portion from the fixing portion and has an elastic resilience biasing against the side outer panel.

11. The upper pillar structure as claimed in claim 10, wherein a guiding portion is provided at one end of the rotating member for guiding a leading edge of the side outer panel.

12. A passenger vehicle comprising the upper pillar structure as claimed in claim 1.

* * * * *